(12) United States Patent
Suzuki

(10) Patent No.: US 6,916,004 B2
(45) Date of Patent: Jul. 12, 2005

(54) ELECTROMAGNETIC VALVE

(75) Inventor: Isao Suzuki, Tokyo (JP)

(73) Assignee: MKS Japan Inc., Tokyo (JP)

( * ) Notice: Subject to any disclaimer, the term of this patent is extended or adjusted under 35 U.S.C. 154(b) by 135 days.

(21) Appl. No.: 10/359,093

(22) Filed: Feb. 6, 2003

(65) Prior Publication Data

US 2004/0104370 A1 Jun. 3, 2004

(30) Foreign Application Priority Data

Nov. 29, 2002 (JP) ........................................ 2002-347738

(51) Int. Cl.$^7$ .............................................. F16K 31/02
(52) U.S. Cl. .................. 251/129.15; 251/359; 251/368
(58) Field of Search ............................ 251/129.15, 368, 251/356, 359

(56) References Cited

U.S. PATENT DOCUMENTS

| | | | |
|---|---|---|---|
| 5,100,100 A | | 3/1992 | Benson et al. |
| 5,253,671 A | | 10/1993 | Kolenc |
| 5,437,542 A | | 8/1995 | Ewing |
| 5,755,428 A | | 5/1998 | Ollivier |
| 5,785,297 A | * | 7/1998 | Ha ........................ 251/129.14 |
| 5,862,995 A | | 1/1999 | Wu |
| 6,431,521 B1 | * | 8/2002 | Jones ........................ 251/319 |

FOREIGN PATENT DOCUMENTS

| | | |
|---|---|---|
| JP | 9-72435 | 3/1997 |
| JP | 2002-250451 | 9/2002 |

* cited by examiner

*Primary Examiner*—Edward K. Look
*Assistant Examiner*—John K. Fristoe, Jr.
(74) *Attorney, Agent, or Firm*—Wenderoth, Lind & Ponack, L.L.P.

(57) ABSTRACT

An electromagnetic valve for opening and closing a fluid flow passage by operating a plunger under a magnetic force of a solenoid. The valve comprises a valve head provided at one of opposite ends of the plunger, and a fixed valve seat including an orifice providing a fluid flow passage. The valve head is adapted to abut against the valve seat to close the orifice. A spring resiliently presses the valve head in a direction for abutment of the valve head against the valve seat to close the orifice. Either one of the valve head and the valve seat is formed from a metallic material and the other is formed from a non-metallic material having a greater hardness than the metallic material. It is preferred that the metallic material be a highly corrosion-resistant metal alloy containing Ni in a high amount ratio, and the non-metallic material be of a ceramic type.

8 Claims, 4 Drawing Sheets

ELECTROMAGNETIC VALVE

BACKGROUND OF THE INVENTION

The present invention relates to an electromagnetic valve for use in a semiconductor manufacturing apparatus, which opens and closes a process-gas flow passage.

Conventionally, a pneumatic valve of the type shown in FIG. 1 has been used for opening and closing a process-gas flow passage in a semiconductor manufacturing apparatus (reference is made to, for example, U.S. Pat. No. 5,253,671 and Unexamined Japanese Patent Application Public Disclosure No. 2002-250451). In order to open and close the valve of this type, $N_2$ (a nitrogen gas) is externally supplied to or discharged from an actuator portion of the valve through a tube, and a stroke of a piston as an actuator is effected by utilizing a pressure of the gas. In this arrangement, a structure for actuating the valve is relatively simple, thus reducing the possibility of malfunctioning and resulting in wide use of the valve of this type. However, due to the time required for supplying or discharging $N_2$ to or from the actuator portion, retardation of valve opening or valve closing occurs, thus limiting the speed of the valve in a high-speed operation. Further, when a plurality of valves are used, it is difficult to open and close the valves simultaneously due to, for example, the $N_2$-supply tubes having different lengths being used for the respective valves. Thus, the valve of this type is unsuitable for a high-speed operation.

A solenoid valve utilizing a solenoid as an actuator has also been used (reference is made to, for example, U.S. Pat. No. 5,862,995). A solenoid valve has a high speed of operation as compared to a pneumatic valve. However, in a solenoid valve, a valve body is formed from a cushioning material such as rubber, so as to prevent leakage of the gas when the valve is closed, and this cushioning material causes generation of impurities. Therefore, there is a tendency of avoiding use of a solenoid valve for a semiconductor manufacturing apparatus.

It has also been proposed to employ a valve in which a valve body is made of a metal, not a cushioning material such as rubber (reference is made to, for example, U.S. Pat. No. 5,755,428). In this valve, at a time the valve is closed, a valve head collides against a valve seat with a large force, thus decreasing the life of the valve.

In order to suppress an impact of a valve body during a valve operation, it has been proposed to use a valve in which a squeezed film is utilized (reference is made to, for example, Unexamined Japanese Patent Application Public Disclosure No. 9-72435). However, the valve of this type is unsuitable for a high-speed operation, especially under reduced pressure.

SUMMARY OF THE INVENTION

In a process for forming an extremely thin film on a wafer, such as an atomic-layer chemical vapor deposition (ALCVD), it is required to open and close a process-gas flow passage by operating a valve at a high speed as high as 10 ms or less. The present invention provides a valve which can be used for such an application. It is an object of the present invention to provide a long-life valve which has high durability and insures a high-speed operation.

It is another object of the present invention to provide a long-life valve which has high durability and insures a high-speed operation, wherein generation of impurities can be prevented by eliminating rubbers and plastics which cause generation of impurities from portions in contact with a gas.

The most important problem involved in a high-speed operation of a valve occurs when a valve head collides against a valve seat to close an orifice. That is, when each of the valve head and the valve seat is made of a metal, both the valve head and the valve seat are worn rapidly due to contact therebetween. Further, when metals are brought into contact with each other repeatedly or under the action of a large force, a so-called cold flow is generated and the metals adhere to each other, so that the valve becomes inoperative. Results of experiments show that this phenomenon is unlikely to occur when the valve head and the valve seat are made of different types of metals or metals having high hardness. The present inventor also conducted an experiment using a valve comprising a valve head made of a metal, in which an operation of opening and closing the valve at a speed of 5 ms was repeated 10 times per second. After the valve was operated from one hundred-of-thousand times to one-million times, the valve head adhered to the valve seat at the orifice, even when the valve seat was formed from a superelastic metal alloy having a hardness of Hv 400. During the repetition of valve operations before adhesion occurred, wear on a contact surface of one of the valve seat and the valve head or respective contact surfaces of the valve seat and the valve head occurred, and part of the worn surface fractured. This results in generation of particles, which increases the danger of contamination.

On the other hand, as conditioning of the manufacturing process of semiconductors become finer, it becomes more desirable to use metals for a valve seat and a valve head. One reason for this is that use of rubber causes process contamination due to wear. Another reason is that moisture adsorbed by rubber during cleaning a manufacturing apparatus is released and causes process contamination.

The present inventor has conducted extensive and intensive studies with respect to various conditions of a valve head and a valve seat. As a result, it has been found that when a valve is arranged by forming either one of the valve head and the valve seat from a metallic material and the other from a non-metallic material having a greater hardness than the metallic material, adhesion between the valve seat and the valve head does not occur even in a high-speed operation, and the valve has a long life.

Illustrative examples of combinations of a valve seat and a valve head include a combination of a valve seat made of a highly corrosion-resistant metal alloy containing Ni in a high amount ratio (comprising 18% or more of Ni) [such as INCONEL (registered trademark), SUS 316L or a superelastic metal alloy] and a valve head comprising a ball made of a non-metallic material such as $Al_2O_3$, $Si_2O_3$ or $Si_3N_4$. This combination gives satisfactorily good results. The life of the valve can be markedly increased also by using a metallic valve seat such as that mentioned above and a valve head comprising a ball or a diaphragm which is formed from a ceramic type non-metallic material having a greater hardness than the metal of the valve seat, such as $Si_2O_3$, $Si_3N_4$, $Ti_2O_3$ or diamond-like carbon. The ball or diaphragm may be formed by coating such a non-metallic material on a metal surface.

The electromagnetic valve of the present invention may be arranged in the form of a diaphragm valve in which a diaphragm is provided between the plunger and the valve seat, and the valve is closed by forcing the diaphragm into direct contact with the valve seat so as to close the orifice.

In this case, each of the diaphragm and the valve seat is made of a metallic material and a contact surface of at least one of the diaphragm and the valve seat is coated with a non-metallic material having a greater hardness than the metallic material, such as $Ti_2O_3$. In this arrangement also, it is possible to obtain a valve having a sufficiently long life for use as a valve for a high-speed operation in a semiconductor manufacturing process.

A ball made of a non-metallic material having a great hardness, such as $Si_3N_4$, may be provided between the metallic diaphragm and the metallic valve seat. In this case, the valve is closed by pressing the ball against the metallic valve seat. In this arrangement also, a valve having a long life can be obtained.

In a conventional solenoid valve, particles are produced and cause process contamination, due to a bias spring for the plunger making frictional contact with the plunger or a yoke. With respect to a cause of this problem, the present inventor has found that opposite end portions of a conventional coil spring make frictional contact with the plunger and the yoke. Therefore, opposite end portions of a coil spring used in the present invention are formed by cylindrical bodies. An intermediate portion of the spring has the same form as a conventional coil spring, and one of the cylindrical end portions of the spring is press-fitted over the plunger and the other cylindrical end portion is press-fitted over the yoke. In this arrangement, the plunger can be held in a space within the yoke without making frictional contact with the spring and the yoke. This prevents process contamination due to generation of particles.

When a solenoid valve is operated at a high speed, a speed of response of the solenoid valve starts to decrease gradually when the frequency of operations exceeds 50 times per minute. It is considered that this phenomenon is caused in part by the weight of the plunger and a natural frequency based on the spring constant. Therefore, in the present invention, the weight of the plunger is reduced to several grams.

Further, a high-speed operation of a solenoid valve can be impeded by eddy currents induced by a magnetic field. In the present invention, a material having high resistance to magnetism and directed in parallel to a magnetic flux passage is provided in the magnetic flux passage, to thereby prevent generation of eddy currents between magnetic fluxes. Specifically, a cut portion in the form of a slit extending in parallel to the magnetic flux passage is formed in part of a coil case and a plunger provided in the magnetic flux passage. A cut portion creates a gap which effectively suppresses generation of eddy currents without seriously affecting the magnetic field of the solenoid. Therefore, a high speed of response of 10 ms or less can be achieved. Further, with this arrangement, a magnetic material provided in a magnetic flux passage can be selected from a wide range of materials. During a high-speed operation, eddy current is mainly generated in the vicinity of an outer surface of the case of the plunger. Therefore, as a cut portion formed in the plunger, a relatively shallow groove having a depth of about 2 mm and a width of about 1 mm is effective.

DETAILED DESCRIPTION OF THE INVENTION

Figure 1:
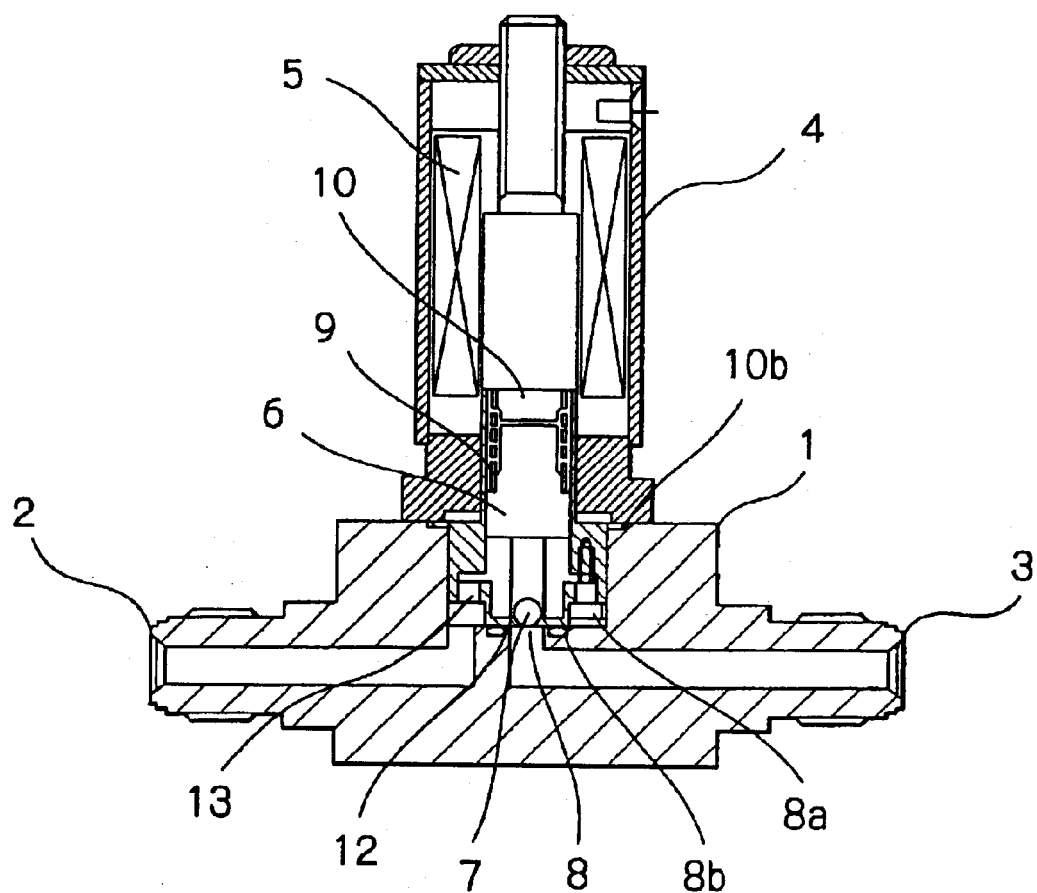
FIG. 1 is a front view, in section, of a flow rate control apparatus in which an electromagnetic valve according to a first embodiment of the invention is incorporated.
Figure 2:
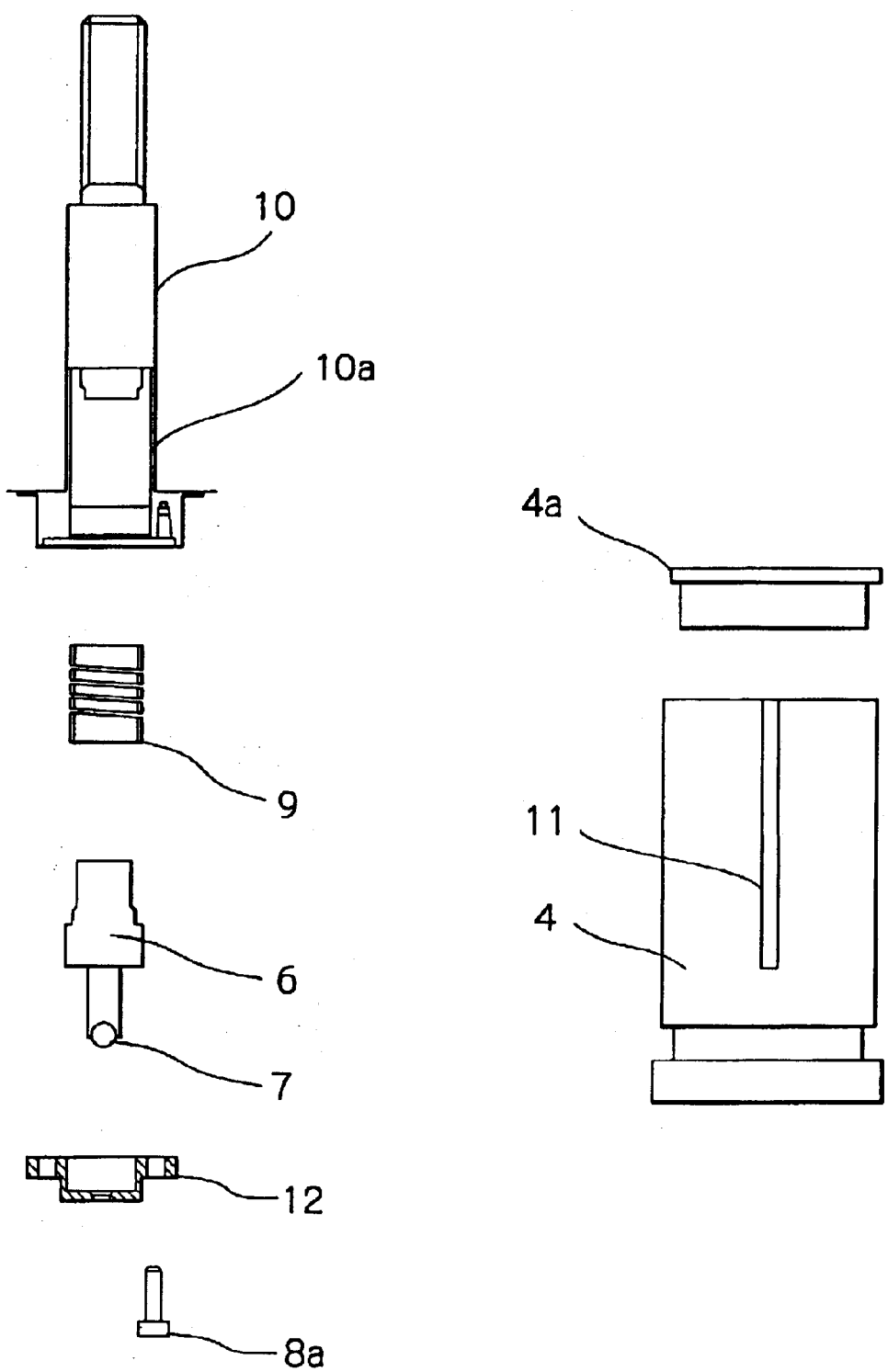
FIG. 2 is a disassembled view of the apparatus of FIG. 1.

FIG. 1 is a front view, in section, of a flow rate control apparatus in which an electromagnetic valve according to a first embodiment of the invention is incorporated. FIG. 2 is a disassembled view of the apparatus of FIG. 1.

The valve comprises a ball-shaped valve head 7 and a valve seat 12 generally in a disk-like form. The valve seat 12 includes an orifice 8 formed at a central portion thereof to provide a gas flow passage. The ball-shaped valve head 7 is made of silicon nitride, which is a non-metallic material having high corrosion resistance against various process gases used for manufacture of semiconductors, and high mechanical strength. The valve seat 12 generally in a disk-like form comprises a thin, disk-shaped plate in which the orifice 8 is formed at a central portion thereof. The valve seat 12 is made of a superelastic metal alloy comprising 53.5% of Ni, 45.5% of Ti and 1% of Fe, which provides high corrosion resistance and high elasticity. A superelastic metal alloy is capable of generating a large elastic restoring force. Therefore, when a superelastic metal alloy is used for a valve seat, permanent deformation of its surface in contact with a valve head can be minimized, and a valve having a long life can be obtained. The orifice 8, which is formed in the thin, disk-shaped plate, is imparted with a funnel-like form, to thereby suppress an effect of impact of the valve head 7.

As shown in FIG. 1, the valve head 7 is fixed, by press fitting, to one end portion of a plunger 6 comprising a magnetic body. Friction stir bonding or diffusion bonding is also effective for fixing a ball made of silicon nitride to the plunger. One end portion of a coil spring 9 is fixed, by press fitting, to the other end portion of the plunger 6. As shown in FIG. 1, the other end portion of the coil spring 9 is fixed, by press fitting, to a cylindrical portion of a yoke 10 on a side thereof facing the plunger 6. The coil spring 9 is generally in a cylindrical form. Each of the opposite end portions of the coil spring 9, which is press-fitted over the plunger 6 or the yoke 10, comprises a cylindrical body having a certain length in an axial direction of the coil spring 9 and an inner diameter suitable for press-fitting to the plunger 6 or the yoke 10. An intermediate portion of the coil spring 9 is formed by a coil of a strip having a relatively narrow width, and has elasticity equal to that of a conventional coil spring. The valve seat 12 is positioned so that the valve head 7 is capable of abutting against the surface of the valve seat 12 defining the funnel-like orifice 8, and fixed to a threaded bore formed at an underneath portion 10a of the yoke 10 by means of a screw. Thus, the valve (7, 12) and the yoke 10 are integrally connected. In a valve-yoke assembly thus obtained, the valve head 7 is normally pressed against the valve seat 12 under a bias force of the coil spring 9, to thereby close the valve. A gas flow passage 13 is formed at an outer peripheral portion of the valve seat 12 separately from the gas flow passage formed by the orifice 8. The gas flow passage 13 forms a gas flow passage communicated with a gas outlet, in cooperation with a stepped (recessed) portion formed at a lower end of the yoke 10.

A solenoid 5 attached to a solenoid case 4 is fitted over the yoke 10 integrally connected to the valve. A solenoid case upper closure 4a is fitted into an upper portion of the solenoid case 4, and fixed by means of a screw applied to a lateral side of the solenoid case 4. Part of the solenoid case 4, which is made of a metal, includes a slit 11 (see FIG. 2). The slit 11 extends in an axial direction of the plunger 6, that is, extends in parallel to a magnetic flux passage of magnetic fluxes generated by the solenoid 5. This suppresses generation of eddy currents and prevents an eddy current loss during a high-speed valve operation. Such a slit for suppressing generation of eddy currents may also be formed in the plunger 6. The solenoid case 4 having the yoke 10 accommodated therein is fixed to a base 1 through two metal seals 8b and 10b by means of a screw. The base 1 includes a gas flow passage extending from a gas outlet 2 to the gas flow passage 13 formed in the valve seat 12, and a gas flow passage extending from the orifice 8 of the valve seat 12 to a gas inlet 3.

The electromagnetic valve is arranged in the above-mentioned manner. In this electromagnetic valve, when a current is applied to the solenoid 5 of a normally closed type, the plunger 6 is forced upward toward the yoke 10 against the bias force of the coil spring 9, so that the valve head 7 is separated from the orifice 8. Consequently, a gas flows from the gas inlet 3 through the valve (7, 12) to the gas outlet 2.

Figure 3:
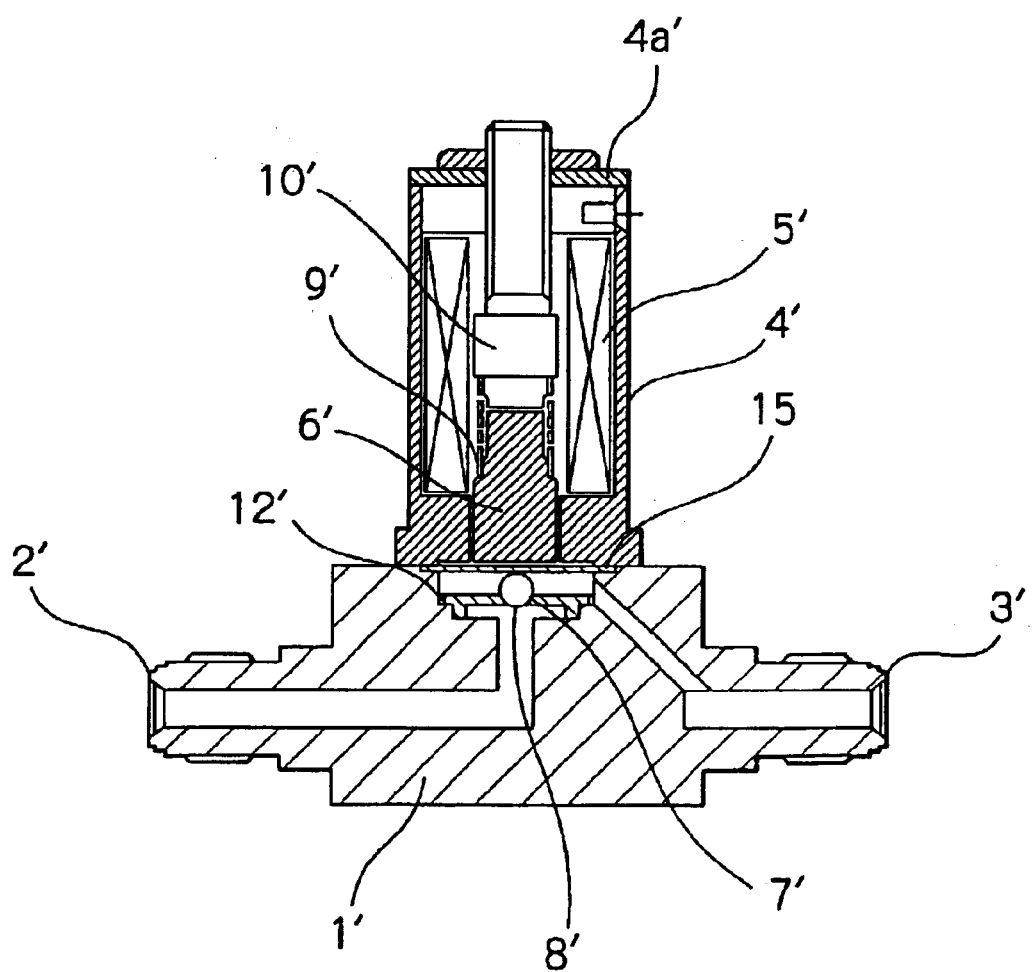
FIG. 3 is a cross-sectional view of an electromagnetic valve according to a second embodiment of the present invention.

FIG. 3 is a cross-sectional view of an electromagnetic valve according to a second embodiment of the present invention. A valve seat 12' is in a disk-like form and includes a funnel-like orifice 8' formed at a central portion thereof. An annular stepped portion is formed on a bottom surface of the valve seat 12', so as to form a recess at a central portion of the valve seat 12'. The stepped portion is fixed to a base 1' by press-fitting. The valve seat 12' including the orifice 8' is made of a superelastic metal alloy comprising 53.5% of Ni, 45.5% of Ti and 1% of Fe.

A valve head 7' comprises a ball made of silicon nitride, which is a non-metallic material. A plunger 6' is provided above the valve head 7' with a metal diaphragm 15 being provided therebetween. A coil spring 9', which has the same form as the coil spring 9 in FIG. 1, has one cylindrical end portion thereof fixed, by press fitting, to an upper end portion of the plunger 6'. The other cylindrical end portion of the coil spring 9' is fixed, by press fitting, to a lower end of a cylindrical portion of a yoke 10' as in the case of FIG. 1. The structure and the form of assembly of a solenoid case 4' having a solenoid 5' attached thereto and a solenoid case upper closure 4a' are the same as those of the valve of FIG. 1. After the yoke 10' is fitted into the solenoid 5', the solenoid case 4' is fixed to the-base 1'. The base 1' includes a gas flow passage extending from a gas outlet 2' to the orifice 8' and a gas flow passage extending from a space surrounding an outer periphery of the valve head 7' to a gas inlet 3'.

In this arrangement, the valve head 7' is normally pressed against the valve seat to close the orifice 8', under a bias force of the coil spring 9', thus closing the valve. When a current is applied to the solenoid 5', the plunger 6' is forced upward toward the yoke 10' against the bias spring of the coil spring 9', so that the valve head 7' is separated from the orifice 8'. Consequently, a gas flows from the gas inlet 3' through the valve to the gas outlet 2'.

Figure 4:
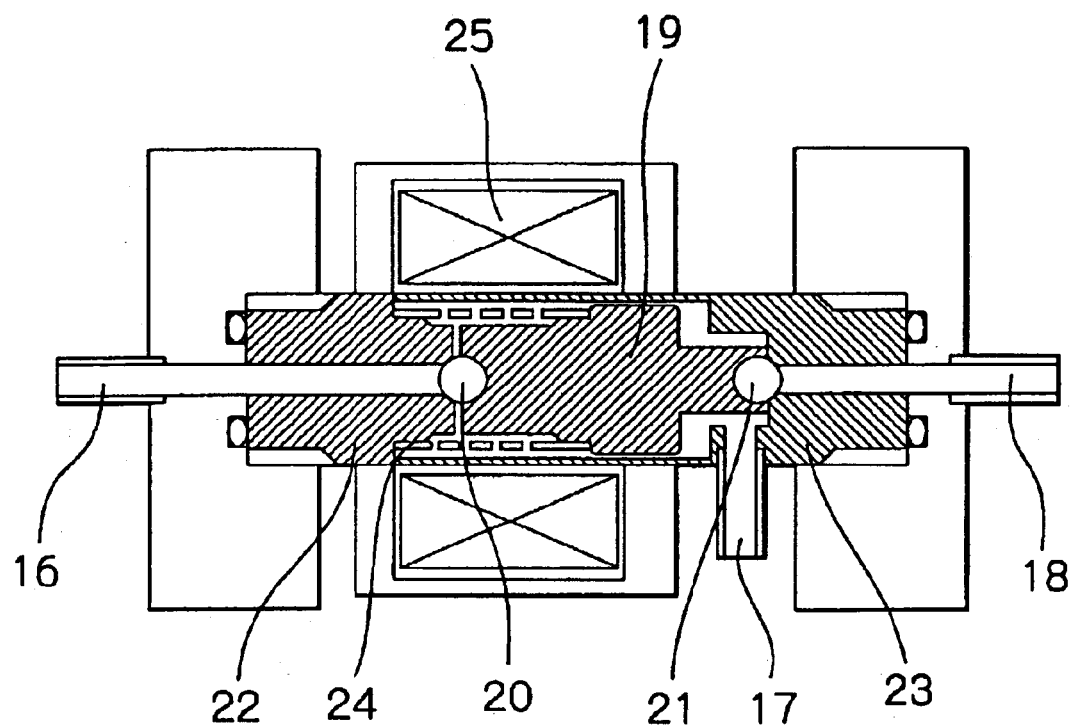
FIG. 4 is a cross-sectional view of an electromagnetic valve according to a third embodiment of the present invention.

FIG. 4 is a cross-sectional view of an electromagnetic valve according to a third embodiment of the present invention. In this embodiment, the valve is arranged in the form of a three-way valve. As shown in FIG. 4, one fluid flow passage 16 on the left side and two fluid flow passages 17 and 18 on the right side are provided, with a valve portion being located therebetween. In this embodiment also, materials for a valve head and a valve seat and a form of a coil spring are determined according to the features of the present invention described above.

Valve heads 20 and 21 are provided at opposite ends of a plunger 19. Valve seats 22 and 23 are provided so as to face the valve heads 20 and 21. In a normal state, under a bias force of a coil spring 24, the plunger 19 is pressed in a rightward direction in FIG. 4, and a flow passage in the valve portion formed by the valve seat 22 and the valve head 20 is open. On the other hand, a flow passage in the valve portion formed by the valve head 21 and the valve seat 23 is closed. Therefore, a gas flows from the fluid flow passage 16 to the fluid flow passage 17 through the flow passage formed by the valve head 20 and the valve seat 22 and a space surrounding an outer periphery of the plunger 19. The flow passage between the fluid flow passage 17 and the fluid flow passage 18 is closed. When a solenoid 25 is energized, a thrust given to the plunger 19 overcomes the bias force of the coil spring 24 and the plunger 19 is forced in a leftward direction in FIG. 4. Consequently, the flow passage in the valve portion formed by the valve head 20 and the valve seat 22 is closed, while the flow passage in the valve portion formed by the valve head 21 and the valve seat 23 is open. Thus, the flow passage between the fluid flow passage 17 and the fluid flow passage 18 is open.

As has been described above, in the electromagnetic valve of the present invention, either one of the valve seat and the valve head is made of a metallic material and the other is made of a non-metallic material having a greater hardness than the metallic material. Therefore, adhesion between the valve head and the valve seat does not occur during a high-speed operation, so that the valve has a long life and insures a high-speed operation.

Further, in the present invention, use is made of a coil spring having opposite end portions formed by cylindrical bodies. An intermediate portion of the coil spring has the same form as a conventional coil spring. One of the cylindrical end portions of the coil spring is press-fitted over the plunger and the other is press-fitted over the yoke. Therefore, the plunger can be held in a space within the yoke without making frictional contact with the spring and the yoke. Therefore, it is possible to prevent process contamination due to generation of particles.

In the present invention, a material having high resistance and directed in parallel to a magnetic flux passage is provided in the magnetic flux passage. Therefore, generation of eddy currents in the magnetic flux passage can be effectively suppressed, thus achieving a high speed of response of 10 ms or less. Further, by this arrangement, a magnetic material to be provided in a magnetic flux passage can be selected from a wide range of materials.

In the present invention, the weight of the plunger is reduced to several grams. Therefore, a delay in response of the solenoid valve does not occur, even in a high-speed operation.

What is claimed is:

1. An electromagnetic valve for opening and closing a fluid flow passage by operating a plunger under a magnetic force of a solenoid, said electromagnetic valve comprising:

a valve head provided at one of opposite ends of the plunger;

a fixed valve seat including an orifice providing a fluid flow passage, the valve head being adapted to abut against the valve seat to close the orifice, to thereby close the fluid flow passage; and a spring which resiliently presses the valve head in a direction for abutment of the valve head against the valve seat to close the orifice, wherein either one of the valve head and the valve seat is formed from a metallic material and the other of the valve head and the valve seat is formed from a non-metallic material having a greater hardness than said metallic material, wherein the valve head comprises a ball made of said non-metallic material, and is provided at the end of the plunger through a metal diaphragm.

2. The electromagnetic valve according to claim 1, wherein said metallic material is a highly corrosion-resistant metal alloy containing Ni in a high amount ratio, and said non-metallic material is of a ceramic type.

3. The electromagnetic valve according to claim 2, wherein said metallic material is one member selected from the group consisting of SUS 316L and an Ni—Ti type superelastic metal alloy, and said non-metallic material is one member selected from the group consisting of $Al_2O_3$, $Si_2O_3$, $Si_3N_4$, $Ti_2O_3$ and diamond-like carbon.

4. The electromagnetic valve according to claim 2, wherein said metallic material contains 18% or more of Ni.

5. The electromagnetic valve according to claim 1, wherein the valve seat is arranged in a disk-like form and comprises a thin plate including an orifice, the orifice being located at a central portion of the valve seat, and the valve seat includes a fluid flow passage formed separately from said orifice and is fixed to a yoke for said solenoid.

6. An electromagnetic valve for opening and closing a fluid flow passage by operating a plunger under a magnetic force of a solenoid, said electromagnetic valve comprising:
- a valve head provided at one of opposite ends of the plunger;
- a fixed valve seat including an orifice providing a fluid flow passage, the valve head being adapted to abut against the valve seat to close the orifice, to thereby close the fluid flow passage; and
- a spring which resiliently presses the valve head in a direction for abutment of the valve head against the valve seat to close the orifice, wherein either one of the valve head and the valve seat is formed from a metallic material and the other of the valve head and the valve seat is formed from a non-metallic material having a greater hardness than said metallic material, wherein the valve head comprises a metal diaphragm having a surface coated with said non-metallic material.

7. An electromagnetic valve for opening and closing a fluid flow passage by operating a plunger under a magnetic force of a solenoid, said electromagnetic valve comprising:
- a valve head provided at one of opposite ends of the plunger;
- a fixed valve seat including an orifice providing a fluid flow passage, the valve head being adapted to abut against the valve seat to close the orifice, to thereby close the fluid flow passage; and
- a spring which resiliently presses the valve head in a direction for abutment of the valve head against the valve seat to close the orifice, wherein either one of the valve head and the valve seat is formed from a metallic material and the other of the valve head and the valve seat is formed from a non-metallic material having a greater hardness than said metallic material, wherein a cut portion is provided in a magnetic flux passage of said electromagnetic valve, said cut portion extending in parallel to the magnetic flux passage.

8. An electromagnetic valve for opening and closing a fluid flow passage by operating a plunger under a magnetic force of a solenoid, said electromagnetic valve comprising:
- a valve head provided at one of opposite ends of the plunger;
- a fixed valve seat including an orifice providing a fluid flow passage, the valve head being adapted to abut against the valve seat to close the orifice, to thereby close the fluid flow passage; and
- a spring which resiliently presses the valve head in a direction for abutment of the valve head against the valve seat to close the orifice, wherein either one of the valve head and the valve seat is formed from a metallic material and the other of the valve head and the valve seat is formed from a non-metallic material having a greater hardness than said metallic material, wherein said spring is a coil spring provided between the plunger and a yoke for the solenoid, said coil spring having an intermediate portion formed by a coil of a metal strip and opposite end portions formed by cylindrical bodies, one of the opposite end portions being press-fitted over the plunger and the other end portion being press-fitted over the yoke.

* * * * *